(12) United States Patent
Zheng et al.

(10) Patent No.: US 10,659,791 B2
(45) Date of Patent: May 19, 2020

(54) HIERARCHY OF MOTION PREDICTION VIDEO BLOCKS

(71) Applicant: QUALCOMM Incorporated, San Diego, CA (US)

(72) Inventors: Yunfei Zheng, San Jose, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/199,840

(22) Filed: Nov. 26, 2018

(65) Prior Publication Data

US 2019/0166371 A1    May 30, 2019

Related U.S. Application Data

(63) Continuation of application No. 13/402,719, filed on Feb. 22, 2012, now Pat. No. 10,171,813.
(Continued)

(51) Int. Cl.
*H04N 19/157* (2014.01)
*H04N 19/105* (2014.01)
(Continued)

(52) U.S. Cl.
CPC ......... *H04N 19/157* (2014.11); *H04N 19/105* (2014.11); *H04N 19/176* (2014.11); *H04N 19/51* (2014.11); *H04N 19/52* (2014.11)

(58) Field of Classification Search
CPC ...... H04N 19/105; H04N 19/52; H04N 19/51; H04N 19/176; H04N 19/157
(Continued)

(56) References Cited

U.S. PATENT DOCUMENTS 6,522,693 B1  2/2003  Lu et al.
7,298,913 B2  11/2007  Koto et al.
(Continued)

FOREIGN PATENT DOCUMENTS

AU    2011274722 A1    1/2013
CN     101146201 A     3/2008
(Continued)

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.
(Continued)

*Primary Examiner* — On S Mung
(74) *Attorney, Agent, or Firm* — Shumaker & Sieffert, P.A.

(57) ABSTRACT

A video decoder is configured to obtain an index value for a current video block. The video decoder obtains a partition type for a current video block. The video decoder selects one of a plurality of defined sets of ordered candidate predictive video blocks based on the partition type of the current video block. A video decoder selects a predictive video block from a selected one of the plurality of defined sets of ordered candidate predictive video blocks based on an index value. A video decoder generates a motion vector for a current video block based on motion information of the predictive video block.

38 Claims, 16 Drawing Sheets

Related U.S. Application Data

(60) Provisional application No. 61/531,526, filed on Sep. 6, 2011, provisional application No. 61/531,514, filed on Sep. 6, 2011, provisional application No. 61/529,110, filed on Aug. 30, 2011, provisional application No. 61/451,493, filed on Mar. 10, 2011, provisional application No. 61/447,017, filed on Feb. 26, 2011, provisional application No. 61/446,392, filed on Feb. 24, 2011.

(51) Int. Cl.
    *H04N 19/52*    (2014.01)
    *H04N 19/176*   (2014.01)
    *H04N 19/51*    (2014.01)

(58) Field of Classification Search
    USPC ........................................ 375/240.12, 240.16
    See application file for complete search history.

(56) References Cited

U.S. PATENT DOCUMENTS

| | | | |
|---|---|---|---|
| 8,335,261 | B2 | 12/2012 | Karczewicz et al. |
| 8,446,954 | B2 | 5/2013 | Tian et al. |
| 10,171,813 | B2 | 1/2019 | Zheng et al. |
| 2004/0136461 | A1 | 7/2004 | Kondo et al. |
| 2004/0190615 | A1 | 9/2004 | Abe et al. |
| 2005/0094727 | A1 | 5/2005 | Ha et al. |
| 2005/0185713 | A1 | 8/2005 | Winger et al. |
| 2007/0009044 | A1 | 1/2007 | Tourapis et al. |
| 2008/0159401 | A1 | 7/2008 | Lee et al. |
| 2008/0165858 | A1* | 7/2008 | Karczewicz ......... H04N 19/176 375/240.23 |
| 2009/0010553 | A1 | 1/2009 | Sagawa |
| 2009/0067500 | A1 | 3/2009 | Jeon |
| 2009/0116558 | A1 | 5/2009 | Chen et al. |
| 2009/0129472 | A1 | 5/2009 | Panusopone et al. |
| 2009/0148058 | A1 | 6/2009 | Dane et al. |
| 2009/0215376 | A1 | 8/2009 | Codling |
| 2009/0245376 | A1* | 10/2009 | Choi ..................... H04N 19/52 375/240.16 |
| 2009/0304084 | A1 | 12/2009 | Hallapuro et al. |
| 2010/0135387 | A1 | 6/2010 | Divorra et al. |
| 2010/0215101 | A1* | 8/2010 | Jeon .................... H04N 19/105 375/240.12 |
| 2011/0013697 | A1 | 1/2011 | Choi et al. |
| 2011/0080954 | A1 | 4/2011 | Bossen et al. |
| 2011/0110429 | A1 | 5/2011 | La et al. |
| 2011/0129015 | A1* | 6/2011 | Nguyen ................ H04N 19/51 375/240.16 |
| 2013/0016785 | A1* | 1/2013 | Wang ................... H04N 19/197 375/240.16 |
| 2013/0028238 | A1 | 1/2013 | Kim et al. |
| 2013/0107959 | A1* | 5/2013 | Park ..................... H04N 19/61 375/240.15 |
| 2013/0156335 | A1* | 6/2013 | Lim ..................... H04N 19/52 382/238 |

FOREIGN PATENT DOCUMENTS

| | | |
|---|---|---|
| CN | 101313587 | 11/2008 |
| CN | 101919255 | 12/2010 |
| EP | 1303144 A1 | 4/2003 |
| EP | 2106146 A2 | 9/2009 |
| JP | 5368631 B2 | 12/2013 |
| RU | 2009130382 | 2/2011 |
| WO | 0172080 A1 | 9/2001 |
| WO | 07038722 | 4/2007 |
| WO | 2008082762 A1 | 7/2008 |
| WO | 2008086316 A2 | 7/2008 |
| WO | 2008086377 A1 | 7/2008 |
| WO | 09076466 | 6/2009 |
| WO | 2010021700 A1 | 2/2010 |
| WO | 2010039733 A2 | 4/2010 |
| WO | 2011001078 A1 | 1/2011 |
| WO | 2011125211 A1 | 10/2011 |
| WO | 2012030193 A2 | 3/2012 |
| WO | 2012005520 A3 | 4/2012 |

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Nov. 7, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross B., et al., "Motion Vector Coding Test Report by Fraunhofer HHI", 4. JCT-VC Meeting; 95. MPEG Meeting; Jan. 20, 2011-Jan. 28, 2011; Daegu; (Joint Collaborative Team on Video Coding of ISO/IEC JTC1/SC291WG11 and ITU-T SG. 16 ); URL: http://wftp3. itu. int/av-arch/jc tvc-site/, No. JCTVC-D314, Jan. 15, 2011 (Jan. 15, 2011), XP030008354, ISSN: 0000-0013, 10 pp.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chiujoh T., et al., "Description of video coding technology proposal by TOSHIBA", Joint Collaborative Team on Video Coding (JCT-VC) of ITU-T SG16 WP3 and ISO/IEC JTC1/SC29/WG11, 1st Meeting: Dresden, DE, Apr. 2010, JCTVC-A117r1, pp. 1-6.

Chujoh, T., et al., "Description of Video Coding Technology Proposal by TOSHIBA", Joint Collaborative Team on Video Coding (JCT-VC) of ITU-T SG16 WP3 and ISO/IEC JTC1/SC291WG11, Document: JCTVC-A117, Status: Input Document to JCT-VC, Apr. 2010, pp. 1-36, Internet.

Dai et al., "Motion Vector Coding Based on Predictor Selection and Boundary-Matching Estimation", Dept. of Electron. & Comput. Eng., Hong Kong Univ. of Sci. & Technol., Kowloon, China, IEEE International Workshop on Multimedia Signal Processing, 2009. MM.

Davies (BBC) T: "Video coding technology proposal by BBC (and Samsung)" , 1. JCT-VC Meeting; Apr. 15, 2010-Apr. 23, 2010; Dresden; (Jointcollaborative Team on Video Coding of ISO/IEC JTC1/SC29WG11 and ITU-TSG.16 ); URL: http://wftp3.itu.int/av-arch/jctvc-site/,, No. XP030007574, Apr. 16, 2010 (Apr. 16, 2010), XP030007575, ISSN: 0000-0049 abstract; figures 2-4 section 2.2.2 "Prediction Unit (PU)" section 2.3.1 "Advanced motion vector prediction (AMVP)".

Davies, T., "BBC's Response to the Call for Proposals on Video Compression Technology", Joint Collaborative Team on Video Coding (JCT-VC) of ITU-T SG16 WP3 and ISO/IEC JTC1/SC29/WG11, Document: JCTVC-A125, Apr. 2010, pp. 1-30, Internet (pp. 1-10, 13-16).

(56) References Cited

OTHER PUBLICATIONS

Fujibayashi, et al., "CE9 3.2d Simplified Motion vector prediction" JCTVC-D231, Joint Collaborative Team on Video Coding (JCT-VC) of ITU-T SG16 WP3 and ISO/IEC JTC1/SC29/WG11, 4th Meeting: Daegu, Korea, Jan. 20-28, 2011.

International Search Report and Written Opinion—PCT/US2012/026368—ISA/EPO—May 10, 2012.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jingjing Dai et al: "Motion Vector Coding Based on Optimal Predictor Selection", Dec. 15, 2009 (Dec. 15, 2009), Advances in Multimedia Information Processing—PCM 2009, Springer Berlin Heidelberg, Berlin, Heidelberg, pp. 1040-1047, XP019134851, ISBN: 978-3-642-10466-4.

Jung J., et al, "Description of Core Experiment 9: MV Coding and Skip/Merge operations", [online], JCTVC-D609, Retrieved from the internet: , Feb. 14, 2011, pp. 1-11.

Laroche G., et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008 (Sep. 1, 2008), pp. 1247-1257, XP011231739, ISSN: 1051-8215, Doi: 10.1109/TCSVT.2008.92882.

Lee et al., "Bi-Prediction Combining Template and Block Motion Compensations," 18th IEEE International Conference on Image Processing (ICIP), Sep. 11-14, 2011,4 pp.

McCann K., et al., "Samsung's Response to the Call for Proposals on Video Compression Technology," Joint Collaborative Team on Video Coding (JCT-VC) of ITU-T SG-16 WP3 and ISO/IEC JTC1/SC29WG11, 1st meeting, Document: JCTVC-A124, Dresden, DE, Apr. 15-23, 2010, 42 pp.

McCann (Zetacast / Samsung) K et al: "Video coding technology proposal by Samsung (and BBC)", 1. JCT-VC Meeting; Apr. 15, 2010-Apr. 23, 2010; Dresden; (Jointcollaborative Team on Video Coding of ISO / IEC JTC1/SC29/WG11 and ITU-TSG.16 ); URL: http://wftp3.itu.int/av-arch/jctvc-site/, Apr. 16, 2010 (Apr. 16, 2010), XP030007574, ISSN: 0000-0049.

Nakamura H., et al., "Unification of derivation process for merge mode and MVP", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F419, pp. 1-10.

Reply to Written Opinion dated May 10, 2012, from International Application No. PCT/US2012/026368, faxed Nov. 20, 2012, pp. 29.

Sato (Sony) K: "Proposals for Improved MV Coding", 2. JCT-VC Meeting, Jul. 21, 2010-Jul. 28, 2010, Geneva, (Joint Collaborativeteam on Video Coding of ISO/IEC JTC1/SC29/WG11 and ITU-TSG.16), No. JCTVC-B081, XP030007661, Jul. 20, 2010. URL: http: //wtfpP3.itu.int/av-arch/jctvc-site/.

Second Examination Report from counterpart Australian Patent Application No. 2012220567, dated Jun. 4, 2015, 6 pp.

Sugio T., et al., "Parsing Robustness for Merge/AMVP", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F470_r4, pp. 1-15.

Tan Y.H., et al.,"Merge/Skip/Direct Simplification", 4. JCT-VC Meeting; 95. MPEG Meeting; Jan. 20, 2011-Jan. 28, 2011; DAEGU; (Joint Collaborative Team on Video Coding of ISO/IEC JTC1/SC29/WG11 and ITU-T SG. 16) ; URL: http://wtfp3.itu.int/av-arch/jctvc-site/,, No. JCTVC-D051, Jan. 15, 2011 (Jan. 15, 2011), XP030008092, ISSN: 0000-0015.

Wiegand, T., et al., "WD2: Working Draft 2 of High-Efficiency Video Coding", Jan. 28, 2011 , No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 160 pages.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Winken M., et al., "Description of Video coding technology proposal by Fraunhofer HHI," JCTVC-A116 Meeting; Apr. 15, 2010-Apr. 23, 2010; Dresden; (Joint Collaborative Team on Video Coding of ISO/IEC JTC1/SC29/WG11 and ITU-TSG. 16) ; URL: http://wftp3. itu. int/av-arch/jctvc-site/, no., Apr. 24, 2010 (Apr. 24, 2010), 44 pages, XP030007557.

Zheng Y. et al., "CE9: Unified Merge and AMVP candidates selection (UNI03)", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F297, Jul. 14, 2011 (Jul. 14, 2011), XP030009320.

Zheng Y., et al., "Unified Motion Vector Predictor Selection for Merge and AMVP", 96. MPEG Meeting; Mar. 21, 2011-Mar. 25, 2011; Geneva; (Motion Picture Expert Group or ISO/IEC JTC1/SC29/WG11), No. m19932, Mar. 19, 2011, pp. 1-5, XP030048499.

Bross B. et al., "CE9: Motion Vector Coding Test Report by Fraunhofer HHI," 4. JCT-VC Meeting; 95. MPEG Meeting; Jan. 20-28, 2011; Daegu, KR (Joint Collaborative Team on Video Coding of ISO/IEC TC1/SC29/WG11 and ITU-T SG. 16 ); URL: htip://wftp3. itu. int/av-arch/jc tvc-sitei, No. JCTVC-D314, Jan. 5, 2011 (Jan. 15, 2011), XP030008354, ISSN: 0000-0013, 10 pp.

International Preliminary Report on Patentability from International Application No. PCT/US2012/026368, dated Apr. 24, 2011, 25 pp.

\* cited by examiner

HIERARCHY OF MOTION PREDICTION VIDEO BLOCKS

This application is a continuation of U.S. application Ser. No. 13/402,719 filed Feb. 22, 2012, which claims the benefit of:

U.S. Provisional Application No. 61/446,392 filed Feb. 24, 2011;
U.S. Provisional Application No. 61/447,017 filed Feb. 26, 2011;
U.S. Provisional Application No. 61/451,493 filed Mar. 10, 2011;
U.S. Provisional Application No. 61/529,110 filed Aug. 30, 2011;
U.S. Provisional Application No. 61/531,526 filed Sep. 6, 2011; and
U.S. Provisional Application No. 61/531,514 filed Sep. 6, 2011, each of which is hereby incorporated by reference in its respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

SUMMARY

In general, this disclosure describes techniques for coding video data. In one example, a method of decoding video data comprises obtaining an index value for a current video block, obtaining a partition type for the current video block, selecting one of a plurality of defined sets of ordered candidate predictive video blocks based on the partition type, selecting a predictive video block from a selected one of the plurality of defined sets of ordered candidate predictive video blocks based on the index value, and generating a motion vector for the current video block based on motion information of the predictive video block.

In another example, a device includes a video decoder configured to obtain an index value for a current video block, obtain a partition type for the current video block, select one of a plurality of defined sets of ordered candidate predictive video blocks based on the partition type, select a predictive video block from a selected one of the plurality of defined sets of ordered candidate predictive video blocks based on the index value, and generate a motion vector for the current video block based on motion information of the predictive video block.

In another example, a computer-readable storage medium comprises instructions that, when executed, cause a processor to obtain an index value for a current video block, obtain a partition type for the current video block, select one of a plurality of defined sets of ordered candidate predictive video blocks based on the partition type, select a predictive video block from a selected one of the plurality of defined sets of ordered candidate predictive video blocks based on the index value, and generate a motion vector for the current video block based on motion information of the predictive video block.

This disclosure also describes techniques for encoding video data. In one example, a method comprises obtaining a motion vector for a current video block, obtaining a partition type for the current video block, selecting one of a plurality of defined sets of ordered candidate predictive video blocks based on the partition type, selecting a predictive video block from a selected one of the plurality of defined sets of ordered candidate predictive video blocks based on the motion vector, and generating an index value identifying a selected predictive video block.

In another example, a device includes a video decoder configured to obtain a motion vector for a current video block, obtain a partition type for the current video block, select one of a plurality of defined sets of ordered candidate predictive video blocks based on the partition type, select a predictive video block from a selected one of the plurality of defined sets of ordered candidate predictive video blocks based on the motion vector, and generate an index value identifying a selected predictive video block.

In another example, a computer-readable storage medium comprises instructions that, when executed, cause a processor to obtain a motion vector for a current video block, obtain a partition type for the current video block, select one of a plurality of defined sets of ordered candidate predictive video blocks based on the partition type, select a predictive video block from a selected one of the plurality of defined sets of ordered candidate predictive video blocks based on the motion vector and generate an index value identifying a selected predictive video block.

The details of one or more examples are set forth in the accompanying drawings and the description below. Other features, objects, and advantages will be apparent from the description and drawings, and from the claims.

DETAILED DESCRIPTION

This disclosure describes techniques for generating sets of motion prediction video blocks from candidate video blocks and creating an ordered hierarchy of the motion prediction video blocks within a set. A video encoder may encode motion information for a current video block using the ordered hierarchy and a video decoder may decode motion information for a current video block using the ordered hierarchy. For example, a set of candidate video blocks may include video blocks adjacent to a current video block. An ordered set of motion prediction video blocks may be a subset of the adjacent video blocks. The motion information for a current video block may be obtained, using the ordered set of motion prediction video blocks including using one of the following techniques: inheriting a motion vector from a motion prediction video block in the ordered set, calculating a motion vector by adding or subtracting residual motion vector information with the motion vector of a motion prediction video block in the ordered set, or calculating a motion vector using the motion vector information from one or more motion prediction video blocks in the ordered set. Using an ordered hierarchy may allow bit savings to be achieved.

In one technique, a set of motion prediction video blocks is generated by analyzing whether candidate video blocks include specified criteria. For example, a number of video blocks within a specified temporal or spatial distance to a current video block can be analyzed to determine whether any of their reference identification values are within a specified range. In this example, the candidate video blocks with a reference identification value equal to a specified value may be included in a set of motion prediction video blocks.

In one technique described by this disclosure, a set of motion prediction video blocks is organized into an ordered hierarchy based on a temporal distance of a reference block associated with each of the motion prediction block and a reference block associated with the current video block being coded. In other words, motion vectors of motion prediction blocks that point to predictive blocks temporally closer to the current video block may be given priority over motion vectors of motion prediction blocks that point to predictive blocks temporally further from the current video block.

In one technique described by this disclosure, an ordered hierarchy of motion prediction video blocks is created based on the partition type of a current video block. A subset of three motion prediction blocks may be generated from a set of five adjacent video blocks based on the partition type of a current video block. A partition type may correspond to the partition shape of a so-called PU consistent with the emerging high efficiency video coding (HEVC) standard.

Figure 1:
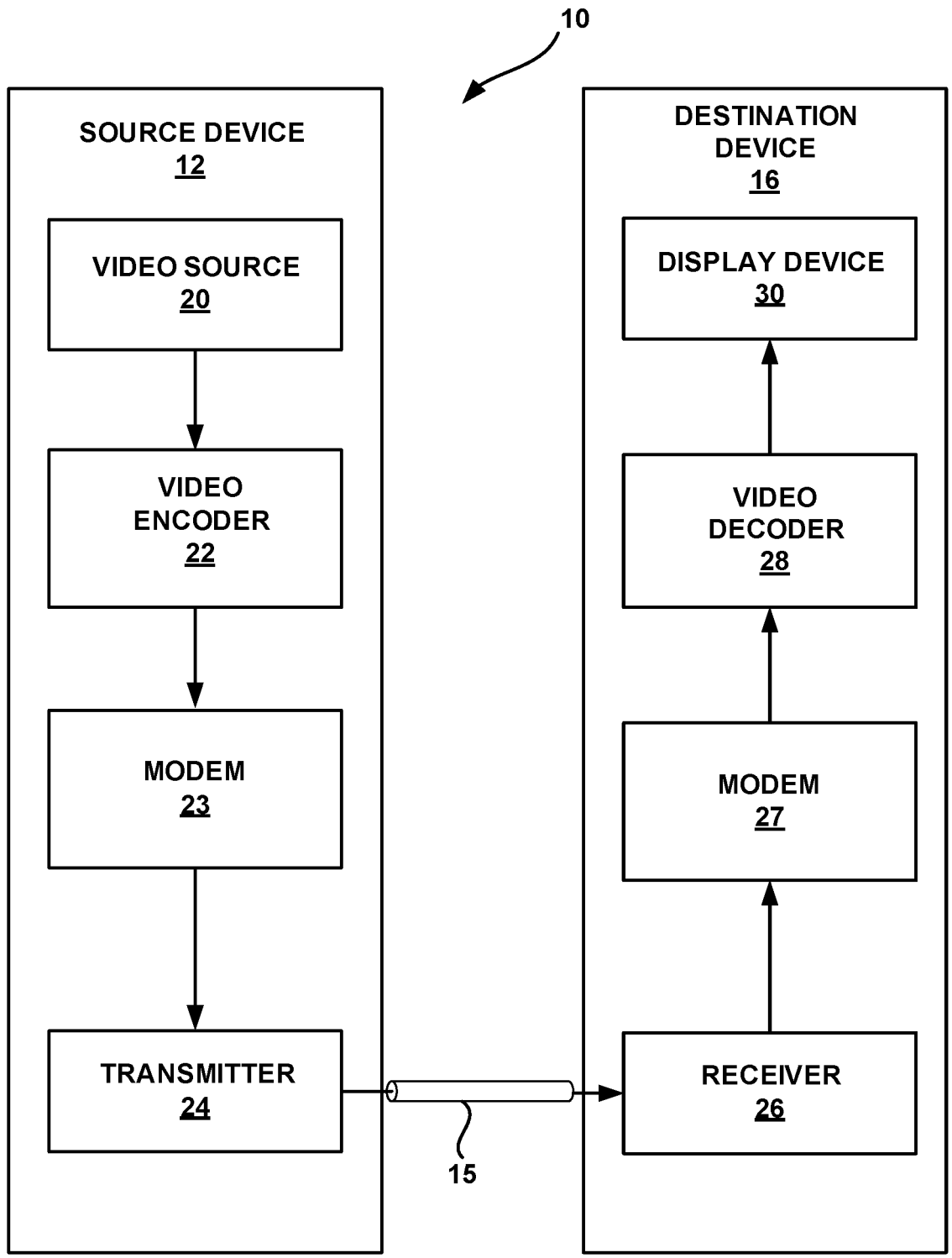
FIG. 1 is a block diagram illustrating one example of a video encoding and decoding system that may implement techniques of this disclosure.

FIG. 1 is a block diagram illustrating one example of a video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply generally to the encoding and decoding may be applied to non-wireless devices including video encoding and/or decoding capabilities. Source device 12 and destination device 16 are merely examples of coding devices that can support the techniques described herein.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. Syntax elements may be generated at video encoder 22 as part of an encoded bitstream, and the syntax elements may be used by video decoder 28 in decoding the bitstream.

Video source 20 may comprise a video capture device, such as a video camera, a video archive containing previously captured video, a video feed from a video content provider or another source of video. As a further alternative, video source 20 may generate computer graphics-based data as the source video, or a combination of live video, archived video, and computer generated video. In some cases, if video source 20 is a video camera, source device 12 and destination device 16 may form so-called camera phones or video phones. In each case, the captured, pre-captured or computer-generated video may be encoded by video encoder 22.

In some examples (but not all cases), once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information. The video decoding process performed by video decoder 28 may include reciprocal techniques to the encoding techniques performed by video encoder 22.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Again, FIG. 1 is merely exemplary and the techniques of this disclosure may apply to video coding settings (e.g., video encoding or video decoding) that do not necessarily include any data communication between the encoding and decoding devices. In other examples, data could be retrieved from a local memory, streamed over a network, or the like. An encoding device may encode and store data to memory, and/or a decoding device may retrieve and decode data from memory. In many cases the encoding and decoding is performed by unrelated devices that do not communicate with one another, but simply encode data to memory and/or retrieve and decode data from memory.

In some cases, video encoder 22 and video decoder 28 may operate substantially according to a video compression standard such as the emerging HEVC standard. However, the techniques of this disclosure may also be applied in the context of a variety of other video coding standards, including some old standards, or new or emerging standards. Although not shown in FIG. 1, in some cases, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DE-MUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder, a decoder, or CODEC, and the terms coder, encoder, decoder and CODEC all refer to specific machines designed for the coding (encoding and/or decoding) of video data consistent with this disclosure.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on blocks of video data consistent with the HEVC standard. HEVC refers to coding units (CUs), which can be partitioned according to a quadtree partitioning scheme. An "LCU" refers to the largest sized coding unit (e.g., the "largest coding unit") supported in a given situation. The LCU size may itself be signaled as part of the bitstream, e.g., as sequence level syntax. The LCU can be partitioned into smaller CUs. The CUs may be partitioned into prediction units (PUs) for purposes of prediction. The PUs may have square or rectangular shapes.

Transforms are not fixed in the emerging HEVC standard, but are defined according to transform unit (TU) sizes, which may be the same size as a given CU, or possibly smaller. Residual samples corresponding to a CU may be subdivided into smaller units using a quadtree structure known as "residual quad tree" (RQT). The leaf nodes of the RQT may be referred as transform units (TUs). The TUs may be transformed and quantized. Syntax elements may be defined at the LCU level, the CU level, the PU level and the TU level. Elements called "split flags" may be included as CU-level syntax to indicate whether any given CU is itself sub-divided into four more CUs. For example, CU0 may refer to the LCU, and CU1 through CU4 may comprise sub-CUs of the LCU.

Consistent with HEVC, the video blocks are referred to as coding units (CUs) and many CUs exist within individual video frames (or other independently defined units of video, such as slices). Frames, slices, portions of frames, groups of pictures, or other data structures may be defined as units of video information that include a plurality of CUs. The CUs may have varying sizes consistent with the HEVC standard, and the bitstream may define largest coding units (LCUs) as the largest size of CU. With the HEVC standard, LCUs may be divided into smaller and smaller CUs according to a quadtree partitioning scheme, and the different CUs that are defined in the scheme may be further partitioned into so-called prediction units (PUs). The LCUs, CUs, and PUs are all video blocks within the meaning of this disclosure.

Video encoder 22 may perform predictive coding in which a video block being coded (e.g., a PU of a CU within an LCU) is compared to one or more predictive candidates in order to identify a predictive block. This process of predictive coding may be intra (in which case the predictive data is generated based on neighboring intra data within the same video frame or slice) or inter (in which case the predictive data is generated based on video data in previous or subsequent frames or slices). Many different coding modes may be supported, and video encoder 22 may select a desirable video coding mode. According to this disclosure, at least some video blocks may be coded using the processes described herein. Video compression techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

When video encoder 22 uses motion estimation and motion compensation to reduce the temporal redundancy in a video sequence, a motion vector can be generated to identify a predictive block of video data. Video decoder 28 can use the motion vector to predict the values of the current video block being coded. For example, values of the predictive video block may be subtracted from the values of the current video block to produce a block of residual data. The motion vector, along with residual data can be communicated from video encoder 22 to the video decoder via communication channel 15. Video decoder 28 can locate the same predictive block (based on the motion vector) and reconstruct the encoded video block by combining the residual data with the data of the predictive block.

Video encoder 22 may use merge mode to encode the motion information of a current video block. Merge mode is a video coding mode in which motion information (such as motion vectors, reference frame indexes, prediction directions, or other information) of a neighboring video block are inherited for a current video block being coded. An index value may be used to identify the neighbor from which the current video block inherits its motion information (e.g., top, top right, left, left bottom or co-located from a temporally adjacent frame). Another case where the motion vector of a neighboring video block is used in the coding of a current video block is so-called motion vector prediction. In this case, predictive coding of motion vectors is applied to reduce the amount of data needed to communicate the motion vector. For example, rather than encoding and communicating the motion vector itself, the video encoder 22 may encode and communicate a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks.

Video encoder 22 may use adaptive motion vector prediction (AMVP) to encode the motion information of a current video block. AMVP builds a motion vector candidate set by including several neighboring blocks in spatial and temporal directions as candidates for the MVP. In AMVP, the video encoder 22 selects the most accurate predictor block from the candidate set based on analysis of encoding rate and distortion (e.g., using so-called rate-distortion cost analysis). A motion vector predictor index (mvp_idx) can be transmitted to a video decoder 28 to inform the video decoder 28 where to locate the MVP. A MVD can also be transmitted to the video decoder 28. Video decoder 28 can combine the MVD with the MVP (defined by the motion vector predictor index) so as to generate the motion vector for the current video block.

After generating the predictive block, the differences between the current video block being coded and the predictive block are coded as a residual block, and prediction syntax (such as a motion vector in the case of inter coding, or a predictive mode in the case of intra coding) is used to identify the predictive block. Moreover, with AMVP or merge mode, the neighboring block used to identify the prediction block may be coded, e.g., via an index value that identifies a particular neighbor according to an ordered hierarchy as described herein.

In some cases, the residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual pixel values) into transform coefficients, which may represent the energy of the pixel values in the frequency domain. Transform coefficients may be quantized. In particular, quantization may be applied to the transform coefficients, and generally involves a process that limits the number of bits associated with any given transform coefficient. More specifically, quantization may be applied according to a quantization parameter (QP) defined at the LCU level. Accordingly, the same level of quantization may be applied to all transform coefficients in the TUs associated with different PUs of CUs within an LCU. However, rather than signal the QP itself, a change or difference (i.e., a delta) in the QP may be signaled with the LCU to indicate the change in QP relative to that of a previous LCU.

Following transform and quantization, entropy coding may be performed on the quantized and transformed residual video blocks. Syntax elements may also be included in the entropy coded bitstream. In general, entropy coding comprises one or more processes that collectively compress a sequence of quantized transform coefficients and/or other syntax information. Scanning techniques may be performed on the quantized transform coefficients in order to define one or more serialized one dimensional vectors of coefficients from two dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data that is used for subsequent prediction-based coding of subsequent video blocks. This is often referred to as a decoding loop of the encoding process, and generally mimics the decoding that is performed by a decoder device. In the decoding loop of an encoder or a decoder, filtering techniques may be used to improve video quality, and e.g., smooth pixel boundaries and possibly remove artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The loop filtering often follows a separate deblock filtering process, which typically applies filtering to pixels that are on or near boundaries of adjacent video blocks in order to remove blockiness artifacts that manifest at video block boundaries.

Figure 2:
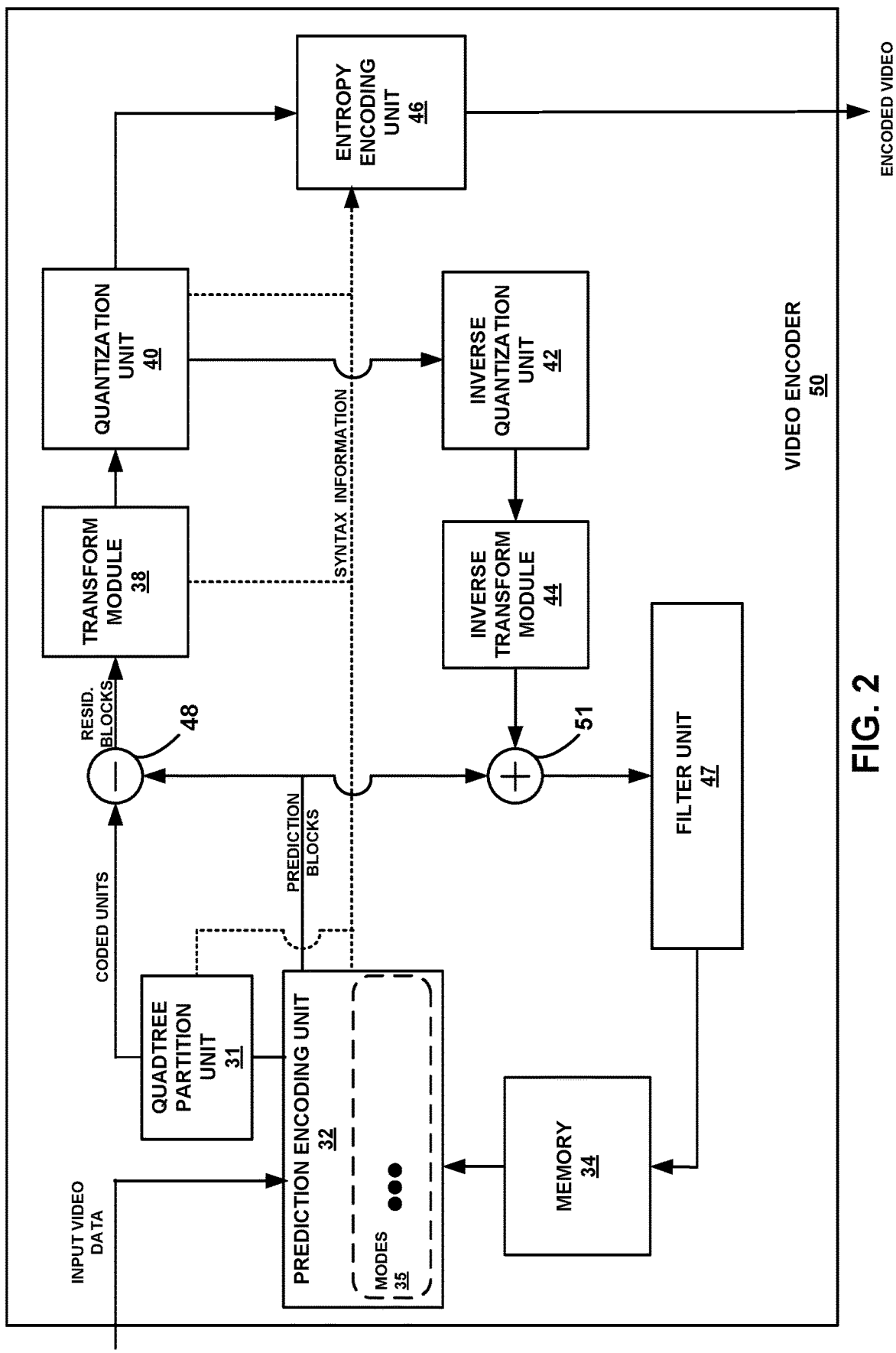
FIG. 2 is a block diagram illustrating one example of a video encoder that may implement techniques of this disclosure.

FIG. 2 is a block diagram illustrating a video encoder 50 consistent with this disclosure. Video encoder 50 may correspond to video encoder 22 of device 12, or a video encoder of a different device. As shown in FIG. 2, video encoder 50 includes a quadtree partition unit 31, prediction encoding unit 32, memory 34, transform module 38, a quantization unit 40, an inverse quantization unit 42, an inverse transform module 44, an entropy coding unit 46, a filter unit 47, which may include deblock filters and post loop and/or in loop filters, adder 48, and adder 51. The encoded video data and syntax information that defines the manner of the encoding may be communicated to entropy encoding unit 46, which performs entropy encoding on the bitstream.

As shown in FIG. 2, prediction encoding unit 32 may support a plurality of different coding modes 35 in the encoding of video blocks. Modes 35 may include inter coding modes that define predictive data from different video frames (or slices). The inter coding modes may be bi-predictive, meaning that two different lists (e.g., List 0 and List 1) of predictive data (and typically two different motion vectors) are used to identify the predictive data. The inter coding modes may alternatively be uni-predictive, meaning that one list (e.g., List 0) of predictive data (and typically one motion vector) is used to identify the predictive data. Interpolations, offsets or other techniques may be performed in conjunction with the generation of predictive data. So-called SKIP modes and DIRECT modes may also be supported, which inherit motion information associated with a co-located block of another frame (or slice). SKIP mode blocks do not include any residual information, while DIRECT mode blocks include residual information.

In addition, modes 35 may include inter coding modes, which define predictive data based on data within the same video frame (or slice) as that being coded. Intra coding modes may include directional modes that define predictive data based on data in a particular direction within the same frame, as well as DC and/or planar modes that define predictive data based on the average or weighted average of neighboring data. Prediction encoding unit 32 may select the mode for a given block based on some criteria, such as based on a rate-distortion analysis or some characteristics of the block, such as the block size, texture or other characteristics.

In accordance with this disclosure, prediction encoding unit 32 supports one or more modes that perform adaptive motion vector prediction (AMVP) as described above or a merge mode as described above. In these or other cases, motion information may be inherited from a block in the manner described herein and signaling of the block from which such inheriting occurs may be performed in the manner described herein.

Generally, during the encoding process, video encoder 50 receives input video data. Prediction encoding unit 32 performs predictive coding techniques on video blocks (e.g. CUs and PUs). Quadtree partition unit 31 may break an LCU into smaller CU's and PU's according to HEVC partitioning. For inter coding, prediction encoding unit 32 compares CUs or PUs to various predictive candidates in one or more video reference frames or slices (e.g., one or more "list" of reference data) in order to define a predictive block. For intra coding, prediction encoding unit 32 generates a predictive block based on neighboring data within the same video frame or slice. Prediction encoding unit 32 outputs the prediction block and adder 48 subtracts the prediction block from the CU or PU being coded in order to generate a residual block. Again, at least some video blocks may be coded using AMVP described herein.

In some cases, prediction encoding unit 32 may include a rate-distortion (R-D) unit that compares coding results of video blocks (e.g., CUs or PUs) in different modes. In this case, prediction encoding unit 32 may also include a mode selection unit to analyze the coding results in terms of coding rate (i.e., coding bits required for the block) and distortion (e.g., representing the video quality of the coded block relative to the original block) in order to make mode selections for video blocks. In this way, the R-D unit may provide analysis of the results of different modes to allow the mode selection unit to select the desired mode for different video blocks. Consistent with this disclosure, a mode that performs AMVP may be selected when an R-D unit identifies it as the desired mode for a given video block, e.g., due to coding gains or coding efficiency. Alternatively, consistent with this disclosure, a merge mode may be selected in which motion information is inherited from a neighboring block. In these or other examples, an ordered set of neighbors can be defined and used in the coding consistent with this disclosure.

Referring again to FIG. 2, after prediction encoding unit 32 outputs the prediction block, and after adder 48 subtracts the prediction block from the video block being coded in order to generate a residual block of residual pixel values, transform unit 38 applies a transform to the residual block. The transform may comprise a discrete cosine transform (DCT) or a conceptually similar transform such as that defined by the ITU H.264 standard or the HEVC standard. So-called "butterfly" structures may be defined to perform the transforms, or matrix-based multiplication could also be used. In some examples, consistent with the HEVC standard, the size of the transform may vary for different CUs, e.g., depending on the level of partitioning that occurs with respect to a given LCU. Transform units (TUs) may be defined in order to set the transform size applied by transform unit 38. Wavelet transforms, integer transforms, subband transforms or other types of transforms could also be used. In any case, transform unit applies the transform to the residual block, producing a block of residual transform coefficients. The transform, in general, may convert the residual information from a pixel domain to a frequency domain.

Quantization unit 40 then quantizes the residual transform coefficients to further reduce bit rate. Quantization unit 40, for example, may limit the number of bits used to code each of the coefficients. In particular, quantization unit 40 may apply the delta QP defined for the LCU so as to define the level of quantization to apply (such as by combining the delta QP with the QP of the previous LCU or some other known QP). After quantization is performed on residual samples, entropy coding unit 46 may scan and entropy encode the data.

CAVLC is one type of entropy coding technique supported by the ITU H.264 standard and the emerging HEVC standard, which may be applied on a vectorized basis by entropy coding unit 46. CAVLC uses variable length coding (VLC) tables in a manner that effectively compresses serialized "runs" of coefficients and/or syntax elements. CABAC is another type of entropy coding technique supported by the ITU H.264 standard or the HEVC standard, which may be applied on a vectorized basis by entropy coding unit 46. CABAC may involve several stages, including binarization, context model selection, and binary arithmetic coding. In this case, entropy coding unit 46 codes coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. The encoded video may comprise the entropy coded vectors and various syntax information. Such information can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction encoding unit 32 to produce a reconstructed video block for storage in memory 34. Prior to such storage, however, filter unit 47 may apply filtering to the video block to improve video quality. The filtering applied by filter unit 47 may reduce artifacts and smooth pixel boundaries. Moreover, filtering may improve compression by generating predictive video blocks that comprise close matches to video blocks being coded.

Figure 3A:
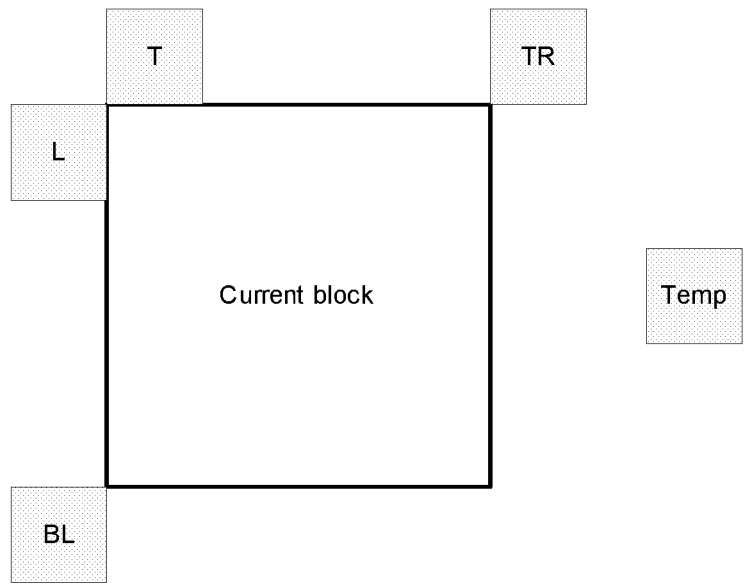
FIG. 3A is a conceptual diagram illustrating a current video block and an example set of motion prediction video blocks.
Figure 3B:
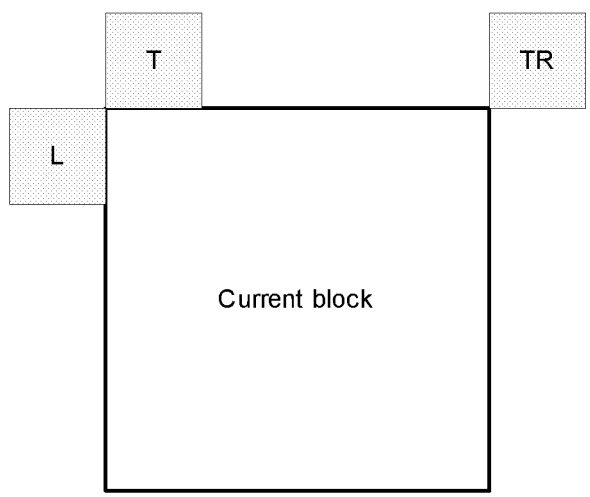
FIG. 3B is a conceptual diagram illustrating a current video block and an example set of motion prediction video blocks.
Figure 3C:
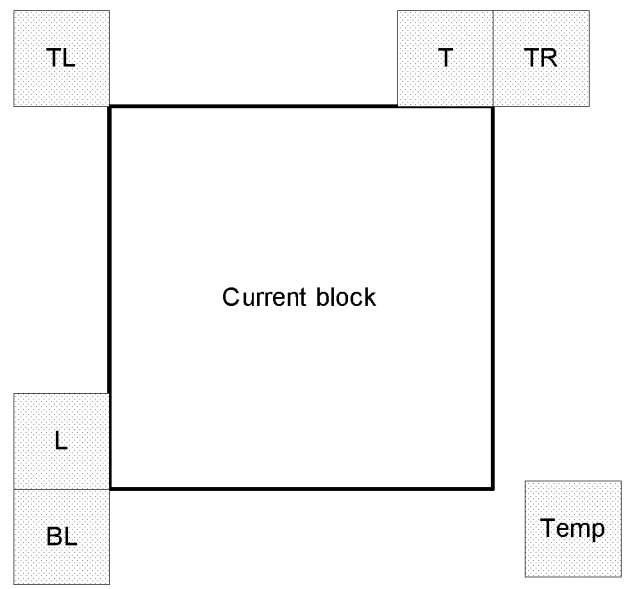
FIG. 3C is a conceptual diagram illustrating a current video block and an example set of motion prediction video blocks.

In accordance with the techniques described herein the prediction encoding unit 32 may use ordered hierarchies to identify a predictive block for encoding a current block and/or may generate an index value that identifies a particular predictive block according to an ordered hierarchy. FIG. 3A is a conceptual diagram illustrating a current video block and candidate predictive motion video blocks (i.e. top (T), top right (TR), left (L), left bottom (BL) or co-located from a temporally adjacent frame (Temp)) from which a current video block may derive motion information. FIG. 3B is a conceptual diagram illustrating a current video block and one of a plurality of sets of predictive motion video blocks that can be derived from the set of candidate predictive motion video blocks in FIG. 3A. FIG. 3C is a conceptual diagram illustrating a current video block and candidate predictive motion video blocks (i.e. top (T), top left (TL) top right (TR), left (L), or left bottom (BL) from which a current video block may derive motion information.

Figure 4:
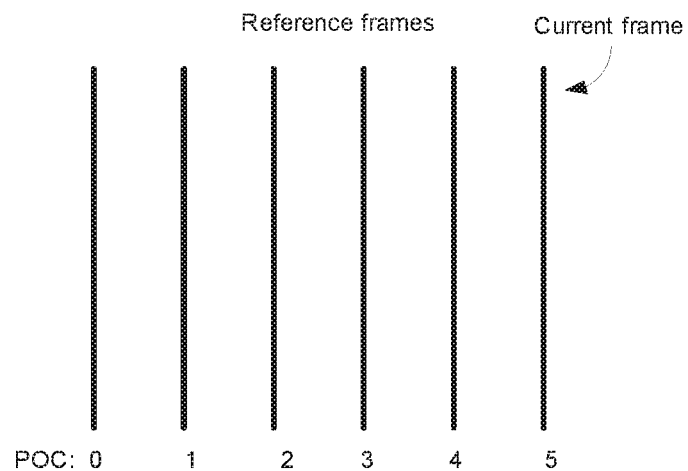
FIG. 4 is a conceptual diagram illustrating the temporal relationship between a current video frame and reference video frames.
Figure 5:
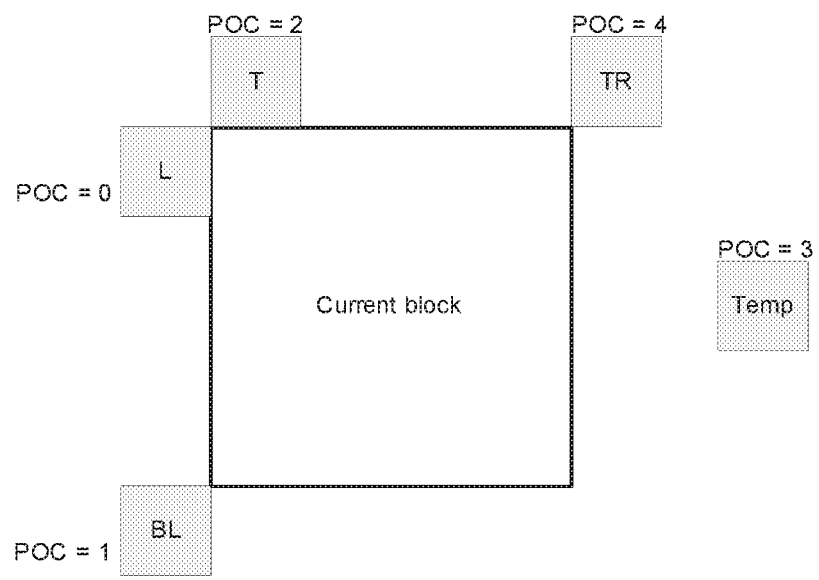
FIG. 5 is a conceptual diagram illustrating ordering a set of motion prediction video blocks based on a temporal relationship with a current video block.

FIGS. 4 and 5 are conceptual diagrams that illustrate using an ordered hierarchy of motion prediction video blocks to identify a predictive video block for encoding a current video block. In the example, illustrated in FIGS. 4 and 5 the temporal distance between a current video block and each of the motion prediction video blocks is used to create an ordered hierarchy. The ordered hierarchy can be created by video encoder 50 based on input video data or created in advanced and stored in memory 34. Creating an ordered hierarchy based on temporal distance may exploit the fact that motion prediction video blocks having shorter temporal distances relative to a current video block may be more likely to be better predictors than video blocks having further temporal distances. In the example illustrated in FIGS. 4 and 5, the set of motion prediction blocks includes the five blocks shown in FIG. 3A. In other examples, the set of motion prediction video blocks can include more or fewer motion prediction video blocks. The size of the set and the motion prediction video blocks included in the set can vary for each current video block. For example, a set of three motion prediction video blocks can be generated using the five video blocks shown in FIG. 5.

A picture order count (POC) associated with the motion information of a motion prediction video block can be used to define the temporal distance between each of the motion prediction video blocks and the current video block. In the example illustrated in FIGS. 4 and 5, the current video block being coded is located in frame 5 (POC=5). The motion information of the motion prediction video blocks points to frame 0 for block L, frame 1 for block BL, frame 2 for block T, frame 3 for block Temp, and frame 4 for block TR. Accordingly, the hierarchy of motion prediction blocks may be defined as: block TR followed by block Temp, followed by block T, followed by block BL, followed by block L.

As described above, prediction encoding unit 32 may utilize the example ordered hierarchy illustrated in FIG. 5 to encode the motion information for a current video block. In one example, an ordered hierarchy can be programmed in advance and stored in memory 34. In another example, video encoder 50 may adaptively generate hierarchies by analyzing video data. Once a hierarchy is determined each of the motion prediction video blocks can be assigned variable code words as index values. The motion prediction video block that has the highest probability of being the highest ranked motion prediction video block for a given current video block may be assigned the shortest code word. In the example, shown in FIG. 5 video block TR may have the shortest code word. By assigning index values differently, depending on the ordered hierarchy (e.g. temporal distance of the motion information), bit savings may be achieved. In some cases, variable length codes may be used to assign shorter codes to motion prediction video blocks with better correlation (e.g. in terms of the temporal distance of the motion information). In other cases, fixed codes may be used, but some motion prediction video blocks may be excluded, thereby allowing for shorter fixed codes due to the use of fewer motion prediction video blocks.

Prediction encoding unit 32 can compare the motion information of the current video block with the motion information of the motion prediction blocks in a set and select an index value for the current video, where the index value identifies one of the motion prediction video blocks. Based on the coding mode the motion information of the current video block may be generated by using the index value to: inherit a motion vector from the identified motion prediction video block or calculate a motion vector by adding or subtracting residual motion vector information with the motion vector of the identified motion prediction video block.

The example method illustrated in FIGS. 4 and 5 may be based on a scenario where the current video block and the motion prediction video block use a uni-predictive directional mode. However, method of FIGS. 4 and 5 may also be extended to bi-predictive scenarios, where each video block has two motion vectors, by considering the combined distance of the two different predictive blocks of motion prediction video blocks coded in bi-predictive mode, relative to the current video block. In some examples, if any of the motion prediction video blocks have the same POC, then a default order may be used or other criteria may be used to order the motion prediction video blocks. In one example, the default order may be block T, followed by block L, followed by block Temp, followed by block TR, followed by block BL. For a five block set any of the 120 possible orders may be used as a default order. Other criteria that may be used to determine the order may include: reference list, reference index, prediction direction, block size, prediction unit size, prediction partition type, transform index, transform size, or other information related to video blocks. For example, ordering may be based on whether the size or shape of the video block being coded is the size or shape of the motion prediction video blocks. If one or more motion prediction video blocks cannot be ordered solely on a specified temporal characteristic (e.g. each motion prediction video block references the same predictive block), a second criteria can be used to conduct further analysis or define a default order. The second criteria may be based on other ordering techniques described herein. In another technique described by this disclosure, a set of motion prediction video blocks may be organized into an ordered hierarchy based on a partition shape of the current video block.

Figure 6:
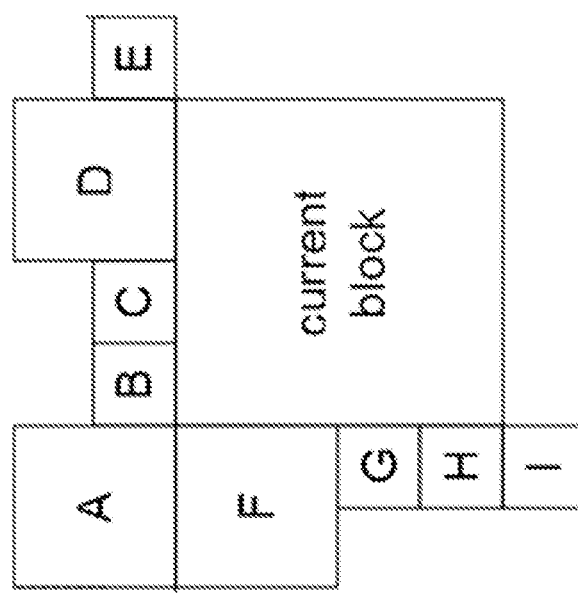
FIG. 6 is a conceptual diagram illustrating examples of candidate video blocks that can be used to generate a set of motion prediction video blocks.

In accordance with the disclosure prediction encoding unit 32 may use other techniques to encode motion information of a current video block. FIG. 6 is a conceptual diagram showing one example of possible videos blocks that may be analyzed for purposes of determining how to encode the motion information of a current video block. In FIG. 6, video blocks are located in the same frame as the current video block. In another example, the candidate video blocks may also be located in different (already encoded/decoded) frames than the current video block. For example, co-located block to the current video block from one or more previously coded frames may also be a candidate video block. Prediction encoding unit 32 may analyze the motion information of the candidate video blocks illustrated in FIG. 6.

Figure 7:
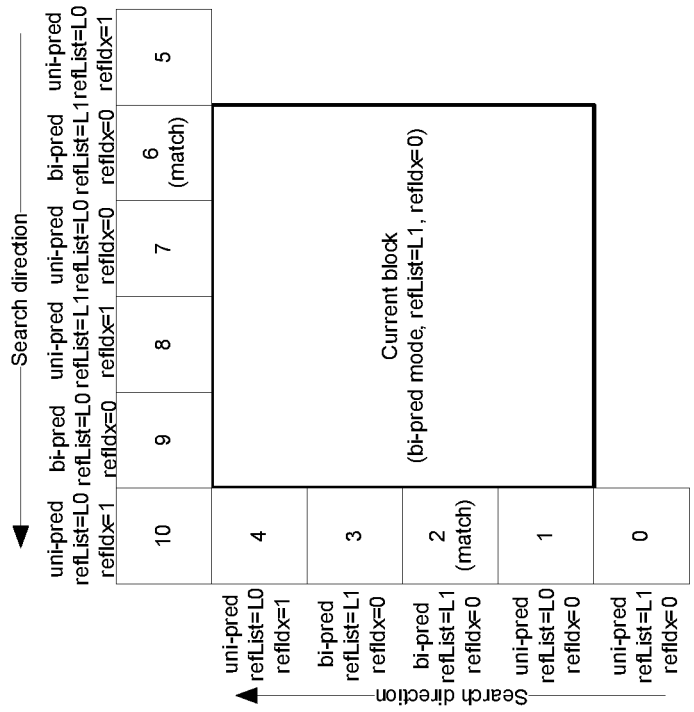
FIG. 7 is a conceptual diagram illustrating an example of a method for searching candidate video blocks based on criteria to generate a set of motion prediction video blocks.

FIG. 7 is a conceptual diagram illustrating an example of a method for analyzing video blocks based on criteria in order to encode motion information for a current video block. Essentially the example illustrated in FIG. 7 illustrates an efficient way to compare motion information of a current video block with video blocks that may be used to encode the motion information of a current video block. The example described in accordance with FIG. 7 may be used to search various sized set of motion prediction video blocks.

In the example shown in FIG. 7, there are eleven motion prediction video blocks. Each of the video blocks includes a direction mode value (i.e., uni-prediction or bi-prediction), a reference list value, and a reference index value. Prior to comparing the motion information of a current video block with motion information of each of the eleven motion prediction video blocks illustrated in FIG. 7, a first comparison of direction mode value, reference list value and reference index value may occur. This may cause fewer motion information comparisons to occur. This way prediction encoding unit 32 can efficiently search for a motion prediction video block for a current video block. According to the example shown in FIG. 7, the reference list value and the reference index value of a motion prediction video block may be compared to the current video block. In the example illustrated in FIG. 7, a determination may be made whether the motion vector of a motion prediction video block predicts from the same reference list and the same reference index as that of the current video blocks motion vector. As illustrated in the example shown in FIG. 7, assuming that a current video block is being coded in bi-prediction mode, and the two motion vectors used in this bi-prediction mode point to reference list L1 and reference index 0, a search can be conducted of the motion prediction video blocks to find blocks coded in bi-prediction mode, and the two motion vectors used in this bi-prediction mode point to reference list L1 and reference index 0.

In the example search method illustrated in FIG. 7, the search starts from the left along the left search direction (from video blocks 0 to 4), if a match is found (in this example candidate video block 2 is a match), the left search may be stopped and a top search is started from candidate video blocks 5 to 10 along the top search direction. Once the first match of top video block candidates is found (in this example video block 6 is a match), the top search may be stopped. The motion information of the current video block may be compared to that of video block 2 and video block 6. This process may be repeated as necessary unit motion information of a predictive video block is within a threshold of motion information of a current video block.

It should be noted that in the example shown in FIG. 7, if prediction direction were not taken into consideration, set of motion prediction blocks may include video block 0 (first match in left search) and video block 6 (first match in top search). Candidate video block 0 may ultimately not be useful for prediction the motion vector information of the current video block, because it is coded in uni-prediction mode.

Consistent with examples of this disclosure, additional criteria may be added to analyze candidate video blocks. In addition to reference list, reference index, and prediction direction, additional criteria may include one or more of block size, prediction unit size, prediction partition type, transform index, transform size, or other information related to the video block.

Prediction encoding unit 32, may generate an index value to inform a decoder where to locate a motion prediction block (e.g. top, left or co-located). A decoder may perform a reciprocal search process to determine a motion prediction video block. In this manner a decoder can generate a motion vector for a current video block by performing a search of a subset of video blocks. Referring to FIG. 7, an index value can indicate a subset of motion prediction video blocks (i.e. video blocks 0 through 4 or video blocks 5 through 10) from a known set. Using the index value a decoder can compare information such as direction mode value, a reference list value, and a reference index value of the motion prediction video blocks with the current video block. If there is a "match," motion information for a current video block may be generated from the first predictive video block that produces a "match." In this manner motion information for a current video block may be encoded by using an index value identifying that subset. This may achieve significant bit savings when compared to generating an index value identifying a predictive video block.

Figure 8:
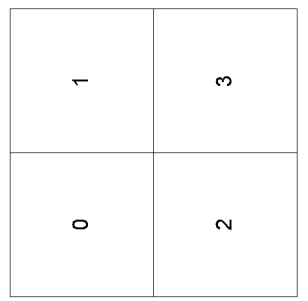
FIG. 8 is a conceptual diagram illustrating examples of video block partitions.
Figure 8:
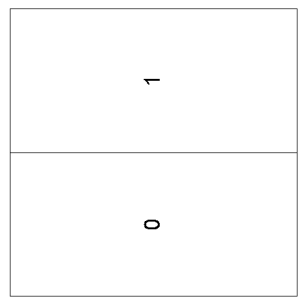
Figure 8:
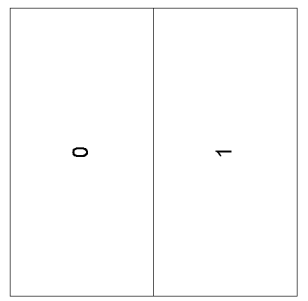
Figure 8:
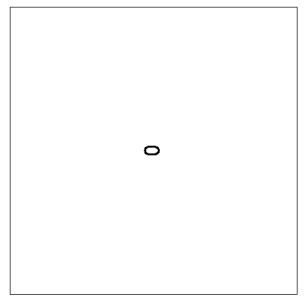

In accordance with the disclosure prediction encoding unit 32 may encode motion information of a current video block using an ordered hierarchy where an ordered hierarchy is based on partition information. FIG. 8 is a conceptual diagram illustrating examples of video block partitions. The prediction partition shapes shown in FIG. 8 are some examples of prediction partition shapes, which may be defined by a prediction unit (PU) and a PU index consistent with the emerging high efficiency video coding (HEVC) standard. When encoding motion information of a current video block using partition shape (which may be defined by a PU shape and an index that defines a size of the PU), the five candidate blocks may be ordered with higher probability to lower probability, where the probability corresponds to the probability that the motion vector of one of the five candidate video blocks will "match" the motion vector of the current video block. The ordered sets can be programmed in advanced and stored at both an encoder and decoder.

FIGS. 9A-9K are conceptual diagrams illustrating examples of creating an ordered hierarchy based on a partition type for a set of motion prediction video blocks. In the examples illustrated in FIGS. 9A-9K, the set of motion prediction blocks includes the five blocks shown in FIG. 3A. In other examples, the set of motion prediction video blocks can include more or fewer motion prediction video blocks. For example, a set may include three motion prediction video blocks. Including less motion prediction video blocks in a set may reduce coding complexity.

In the examples shown in FIGS. 9A-9K, the numbers inside the motion prediction video blocks represent the hierarchal order of the motion prediction video blocks. For each prediction partition shape (which may be defined by a PU shape and an index that defines a size of the PU), the ordering can be programmed in advanced and stored at both the encoder and decoder.

Figure 9A:
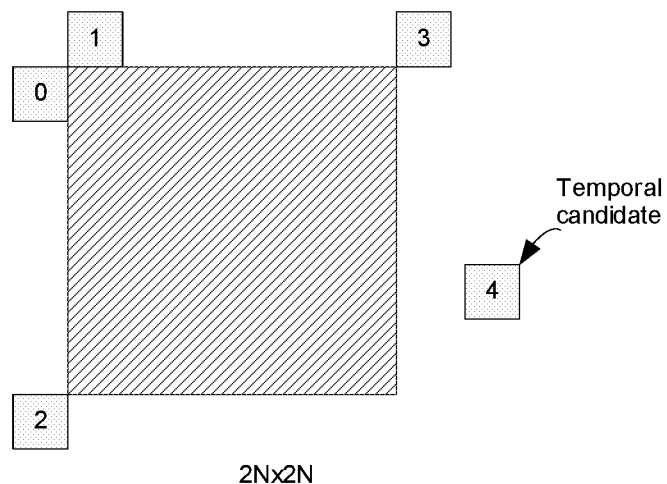
FIG. 9A-9K are conceptual diagrams illustrating examples creating an ordered hierarchy based on a current video block partition for a set of motion prediction video blocks.

For example, in FIG. 9A a hierarchy of motion prediction video blocks when the partition shape is 2N×2N may be defined as: block L, block T, block BL, block TR, Temp.

Figure 9B:
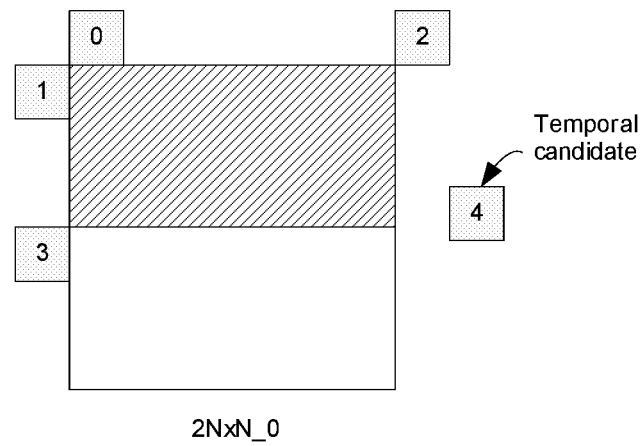

For example, in FIG. 9B a hierarchy of motion prediction video blocks when the partition shape is 2N×N_0 may be defined as: block T, block L, block TR, block BL, Temp.

Figure 9C:
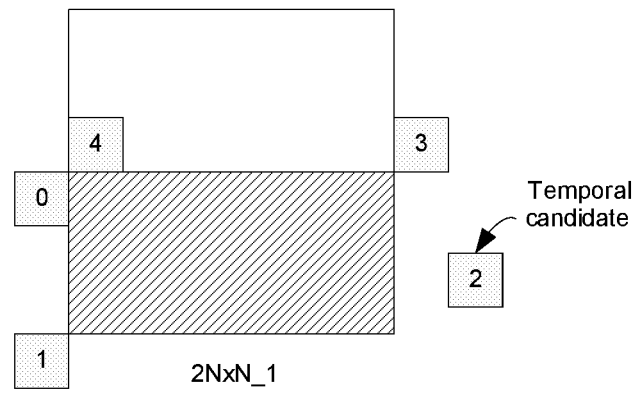

For example, in FIG. 9C a hierarchy of motion prediction video blocks when the partition shape is N×2N_1 may be defined as: block L, block BL, block Temp, block TR, block T.

Figure 9D:
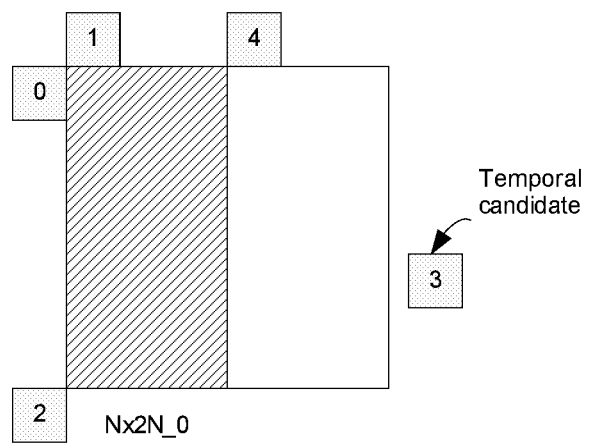

For example, in FIG. 9D a hierarchy of motion prediction video blocks when the partition shape is N×2N_0 may be defined as: block L, block T, block BL, Temp, block TR.

Figure 9E:
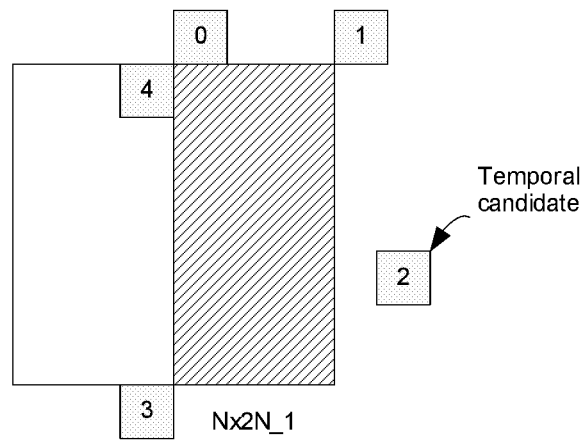

For example, in FIG. 9E a hierarchy of motion prediction video blocks when the partition shape is N×2N_1 may be defined as: block T, block TR, Temp, block BL, block L.

Figure 9F:
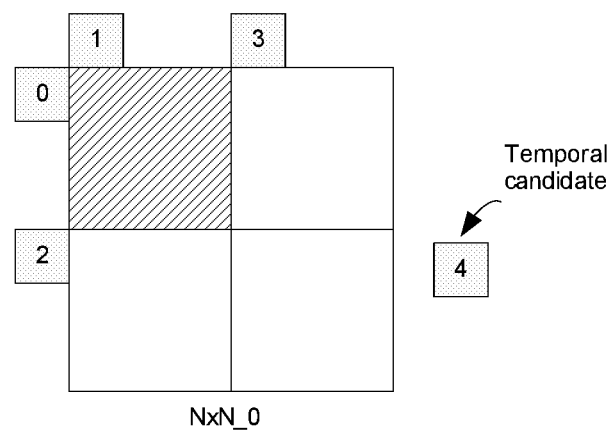

For example, in FIG. 9F a hierarchy of motion prediction video blocks when the partition shape is N×N_0 may be defined as: block L, block T, block BL, block TR, Temp.

Figure 9G:
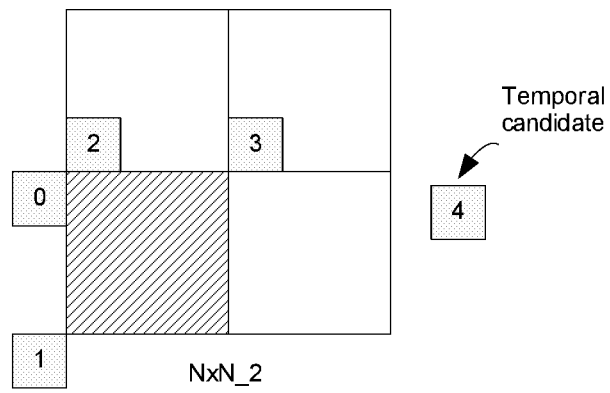

For example, in FIG. 9G a hierarchy of motion prediction video blocks when the partition shape is N×N_2 may be defined as: block L, block BL, block T, block TR, Temp.

Figure 9H:
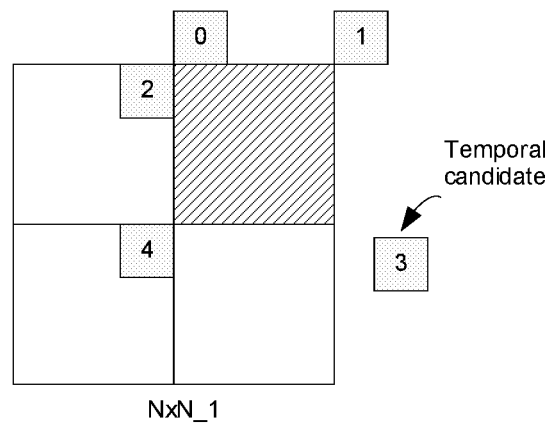

For example, in FIG. 9H a hierarchy of motion prediction video blocks when the partition shape is N×N_1 may be defined as: block T, block TR, block L, Temp, block BL.

Figure 9I:
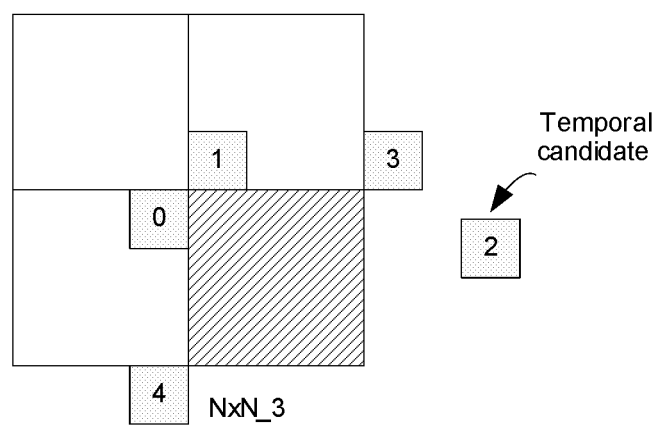

For example, in FIG. 9I a hierarchy of motion prediction video blocks when the partition shape is N×N_3 may be defined as: block L, block T, Temp, block TR, block BL.

Figure 9J:
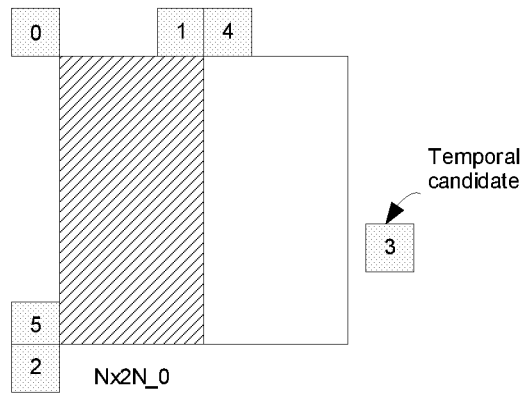

For example, in FIG. 9J a hierarchy of motion prediction video blocks when the partition shape is N×2N_0 may be defined as: block TL, block T, block BL, Temp, block TR, block L.

Figure 9K:
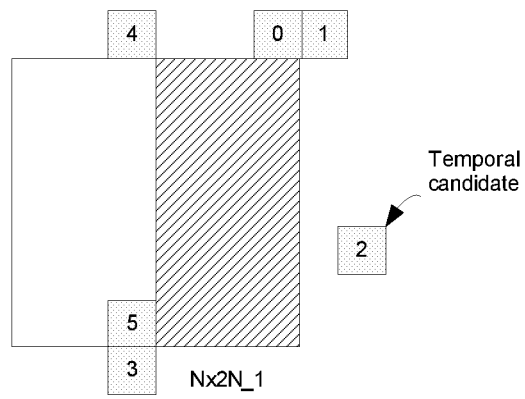

For example, in FIG. 9K a hierarchy of motion prediction video blocks when the partition shape is N×2N_1 may be defined as: block T, block TR, Temp, block BL, block TL, block L.

Figure 10:
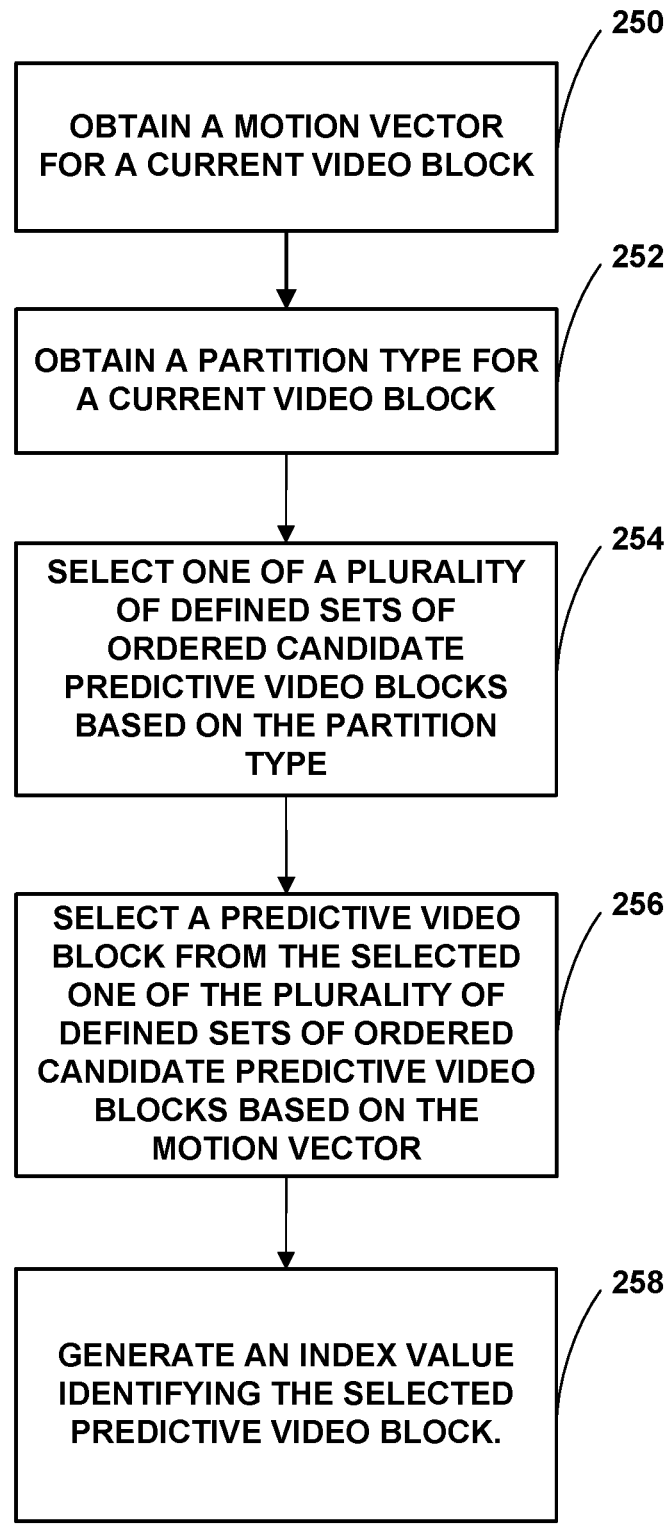
FIG. 10 is a flowchart illustrating a technique for encoding video data.

Prediction encoding unit 32 may encode motion information of a current video block using the example hierarchal ordering illustrated in FIGS. 9A-9K. The example hierarchal ordering can be stored in memory 34. FIG. 10 is an example of a flowchart illustrating a technique for encoding video data using the example hierarchal ordering in FIGS. 9A-9K. It should be noted that although FIG. 10 is described in conjunction with video encoder 50, steps described in FIG. 10 may be performed by other devices and components. At step 250, prediction encoding unit 32 obtains a motion vector for a current video block. As described above a motion vector indicates a predictive video block that may be used to encode a current video block. At step 252, prediction encoding unit 32 obtains a partition type for a current video block. Prediction encoding unit 32 may receive a partition type value from quadtree partition unit 31. In one example, a partition type corresponds to one of partition types described in FIGS. 9A-9K.

At step 254, prediction encoding unit 32 selects one of a plurality of defined sets of ordered candidate predictive video blocks based on the partition type. For example, if the partition type is N×2N_1 the set of ordered candidate predictive video blocks may be defined as: block T, block TR, Temp, block BL, block L. At step 256, prediction encoding unit 32 selects a predictive video block from the selected one of the plurality of defined sets of ordered candidate predictive video blocks based on the motion vector of the current video block. At step 256, the motion vector of the current video block may be compared to each of the motion vectors of the candidate video blocks within the set. The comparison may be done in a similar manner to the search described according to FIG. 7, where the minimum number of motion vector comparisons is performed and if a motion vector is found within a threshold of the motion vector of the current video block the search is complete. At step 258 prediction encoding unit 32 generates an index value identifying the selected predictive video block. Index values for each of the predictive video blocks may be stored in memory 34.

Variable length code words may be used as index values for each of the motion prediction video blocks. The motion prediction video block that has the highest probability of being the highest ranked motion prediction video block for a given current video block may be assigned the shortest code word. By assigning variable length index values, bit savings may be achieved. A decoder may be programmed to know the same hierarchy, and therefore, can properly interpret the received a codeword to make the same selection used as an encoder. In one example, the highest ranking predictive video block in each of the sets defined in FIGS. 9A-9K may be assigned a one bit index value. In other examples, only a subset (e.g., the top 3 of 5) may be considered in any given scenario, which may reduce coding complexity. In this manner, if several video blocks in a group are encoded using only a subset of the video blocks, the number of index values used to encode the group can further be reduced. In this case a video encoder 50 may signal a reduced set of index values for a group of encoded video blocks.

The examples of creating an ordered hierarchy of motion prediction video blocks based on partition shape described herein can be utilized in conjunction with methods for generating motion information for a current video block. For example, an encoder may generate a current video block using any of the following techniques: inheriting a motion vector from the identified motion prediction video block, calculating a motion vector by adding or subtracting residual motion vector information with a motion vector of an identified motion prediction video block, or calculating a motion vector using the motion vector information from one or more high ranking motion prediction video blocks by selecting a median motion vector or averaging motion vectors.

Figure 11:
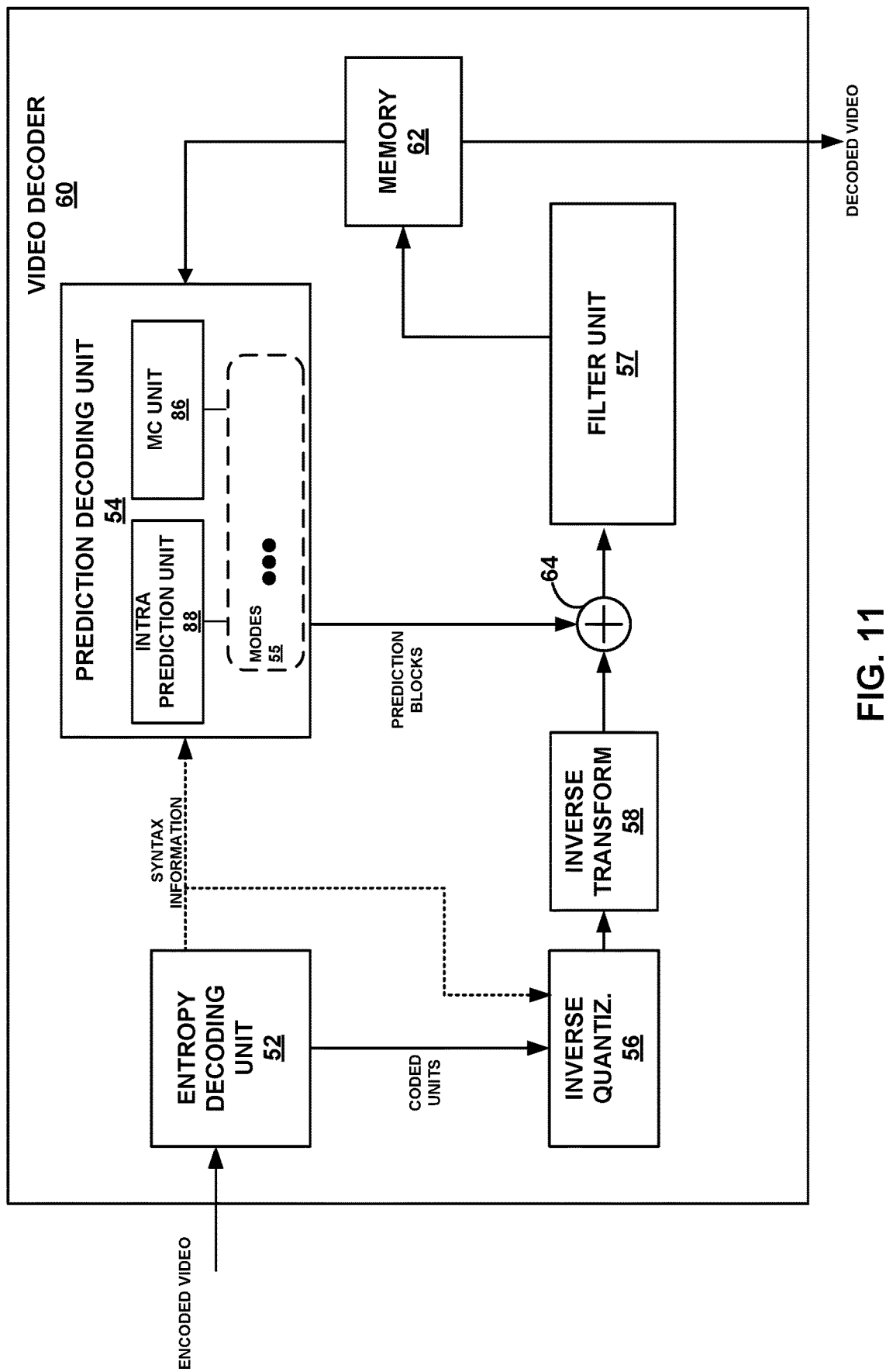
FIG. 11 is a block diagram illustrating one example of a video decoder unit that may implement techniques of this disclosure.

FIG. 11 is a block diagram illustrating an example of a video decoder 60, which decodes a video sequence that is encoded in the manner described herein. The techniques of this disclosure may be performed by video decoder 60 in some examples. In particular, video decoder 60 may perform one or more of the techniques of determining motion information for a current video block described herein as part of a decoding process.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Video decoder 60 also includes a prediction decoding unit 54, an inverse quantization unit 56, an inverse transform unit 58, a memory 62, and a summer 64. In particular, like video encoder 50, video decoder 60 includes a prediction decoding unit 54 and a filter unit 57. Prediction decoding unit 54 of video decoder 60 may include motion compensation unit 86, which decodes inter coded blocks and possibly includes one or more interpolation filters for sub-pixel interpolation in the motion compensation process. Prediction decoding unit 54 may also include an intra prediction unit for decoding intra modes. Prediction decoding unit 54 may support a plurality of modes 55 including one or more modes that support AMVP and/or one or more merge modes. Filter unit 57 may filter the output of summer 64, and may receive entropy decoded filter information so as to define the filter coefficients applied in the loop filtering.

Upon receiving encoded video data, entropy decoding unit 52 performs reciprocal decoding to the encoding performed by entropy encoding unit 46 (of encoder 50 in FIG. 2). At the decoder, entropy decoding unit 52 parses the bitstream to determine LCU's and the corresponding partitioning associated with the LCU's. In some examples, an LCU or the CUs of the LCU may define coding modes that were used, and these coding modes may include the bi-predictive merge mode. Accordingly, entropy decoding unit 52 may forward the syntax information to prediction unit that identifies the bi-predictive merge mode.

Figure 12:
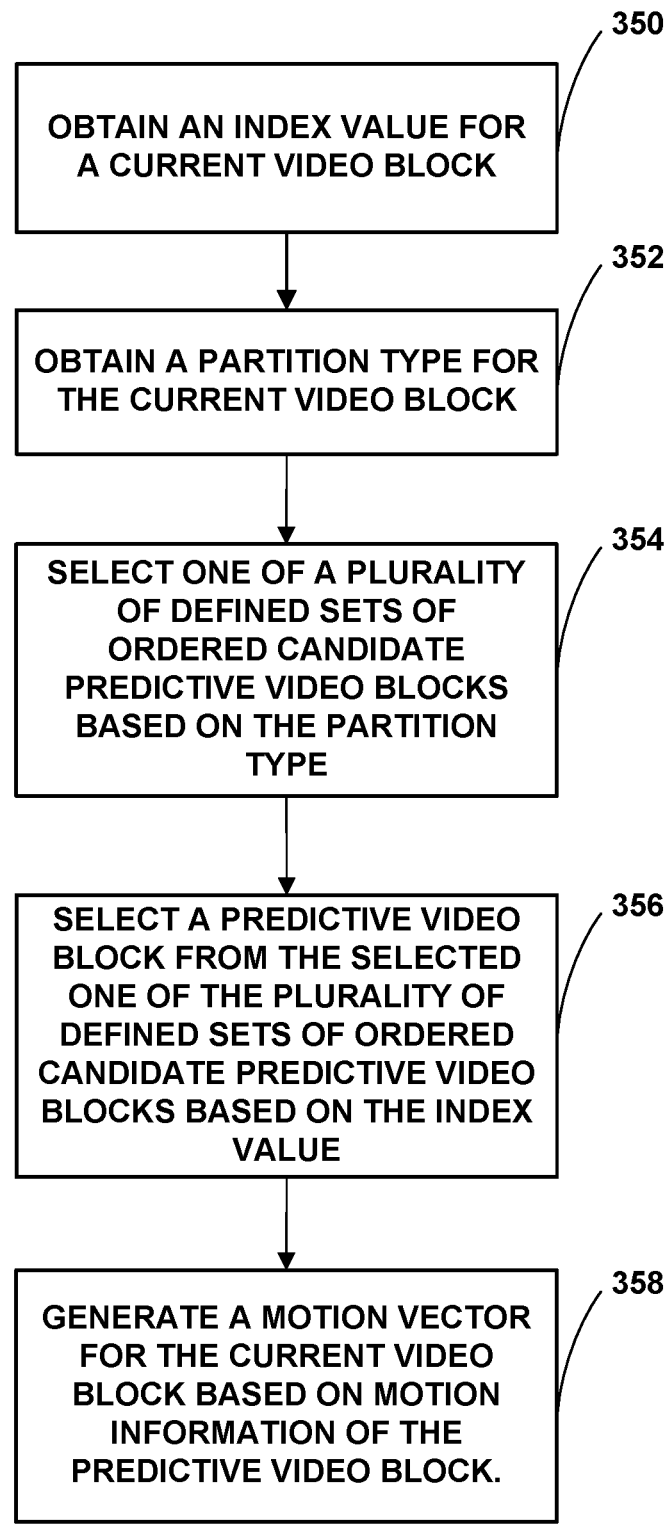
FIG. 12 is a flowchart illustrating a technique for decoding video data.

FIG. 12 is an example of a flowchart illustrating a technique for decoding video data using the example hierarchal ordering in FIGS. 9A-9K. It should be noted that although FIG. 12 is described in conjunction with video encoder 60, steps described in FIG. 12 may be performed by other devices and components. At step 350, predictive decoding 54 unit obtains an index value for a current video block. As described above in accordance with FIG. 10 an index value indicates a predictive video block that may be used to generate a motion vector for a current video block. At step 352, predictive decoding unit 54 obtains a partition type for a current video block. In one example, a partition type corresponds to one of partition types described in FIGS. 9A-9K. At step 354, predictive decoding unit 54 selects one of a plurality of defined sets of ordered candidate predictive video blocks based on the partition type. For example, if the partition type is N×2N_1 the set of ordered candidate predictive video blocks may be defined as: block T, block TR, Temp, block BL, block L. At step 356, predictive decoding unit 54 selects a predictive video block from the selected one of the plurality of defined sets of ordered candidate predictive video blocks based on the index value. At step 358, predictive decoding unit 54 generates a motion vector. For example, predictive decoding unit 54 may generate a motion vector using any of the following techniques: inheriting a motion vector from the identified motion prediction video block, calculating a motion vector by adding or subtracting residual motion vector information with a motion vector of an identified motion prediction video block, or calculating a motion vector using the motion vector information from one or more high ranking motion prediction video blocks by selecting a median motion vector or averaging motion vectors.

In the example described in FIG. 12 decoder 60 may be programmed to know the partition shape hierarchies described in FIGS. 9A-9K, and therefore, can properly interpret the received index value to make the same prediction video block selection as encoder 50. In one example, the highest ranking predictive video block in each of the sets defined in FIGS. 9A-9K may be assigned a one bit index value. In other examples, only a subset (e.g., the top 3 of 5) may be considered in any given scenario, which may reduce coding complexity. For example, for an N×2N_1 partition the set of ordered candidate predictive video blocks block T, block TR, and Temp may be assigned the following index values: 1, 01, and 00. In this manner if several video blocks are encoding using only the top 3 video blocks index values can further bit savings may be achieved. In this case a video encoder 50 may signal the number of predictive motion video blocks for a group of encoded video blocks. This is can be accomplished in a similar manner as the set of left set of blocks is signaled in the example describe in accordance with FIG. 7.

It should be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    obtaining an index value for a current video block;
    decoding, from a bitstream, one or more syntax elements that indicate a number of motion vector prediction candidates for the current video block and that a subset of motion vector prediction candidates was used to encode the current video block;
    generating a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
    selecting a predictive video block from the set of generated candidate predictive blocks based on the index value; and
    generating motion information for the current video block based on motion information of the predictive video block.

2. The method of claim 1, wherein generating the motion information for the current video block includes inheriting motion information from the predictive video block.

3. The method of claim 2, wherein inheriting the motion information includes inheriting a motion vector and a reference frame index from the predictive video block.

4. The method of claim 1, wherein set of generated candidate predictive blocks includes three candidate predictive blocks.

5. The method of claim 1, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

6. The method of claim 1, wherein the index value comprises a variable length code word.

7. The method of claim 6, wherein a length of the variable length code word is associated with a probability of the candidate predictive block being a highest ranked motion prediction video block for the current video block.

8. A device for decoding video data, the device comprising:
    a memory configured to store video data; and
    a video decoder configured to communicate with the memory and to:
        obtain an index value for a current video block;
        decode, from a bitstream, one or more syntax elements that indicate a number of motion vector prediction candidates for the current video block and a subset of motion vector prediction candidates was used to encode the current video block;
        generate a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
        select a predictive video block from the set of generated candidate predictive blocks based on the index value; and
        generate motion information for the current video block based on motion information of the predictive video block.

9. The device of claim 8, wherein the video decoder being configured to generate the motion information for the current video block includes the video decoder being configured to inherit motion information from the predictive video block, wherein the motion information includes a motion vector and a reference frame index.

10. The device of claim 8, wherein set of generated candidate predictive blocks includes three candidate predictive blocks.

11. The device of claim 8, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

12. The device of claim 8, wherein the index value comprises a variable length code word, wherein a length of the variable length code word is associated with a probability of the candidate predictive block being a highest ranked motion prediction video block for the current video block.

13. A device for decoding video data, the device comprising:
    means for obtaining an index value for a current video block;
    means for decoding, from a bitstream, one or more syntax elements that indicate a number of motion vector prediction candidates for the current video block and a subset of motion vector prediction candidates was used to encode the current video block;
    means for generating a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
    means for selecting a predictive video block from the set of generated candidate predictive blocks based on the index value; and
    means for generating motion information for the current video block based on motion information of the predictive video block.

14. The device of claim 13, wherein the means for generating the motion information for the current video block includes means for inheriting motion information from the predictive video block, wherein the motion information includes a motion vector and a reference frame index.

15. The device of claim 13, wherein set of generated candidate predictive blocks includes three candidate predictive blocks.

16. The device of claim 13, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

17. The device of claim 13, wherein the index value comprises a variable length code word, wherein a length of the variable length code word is associated with a probability of the candidate predictive block being a highest ranked motion prediction video block for the current video block.

18. A non-transitory computer-readable storage medium having stored thereon instructions that, when executed, cause a processor of a device for decoding video data to:
obtain an index value for a current video block;
decode, from a bitstream, one or more syntax elements that indicate a number of motion vector prediction candidates for the current video block and a subset of motion vector prediction candidates was used to encode the current video block;
generate a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
select a predictive video block from the set of generated candidate predictive blocks based on the index value; and
generate motion information for the current video block based on motion information of the predictive video block.

19. The non-transitory computer-readable storage medium of claim 18, wherein the instructions that cause the processor to generate the motion information for the current video block include instructions that cause the processor to inherit motion information from the predictive video block, wherein the motion information includes a motion vector and a reference frame index.

20. The non-transitory computer-readable storage medium of claim 18, wherein set of generated candidate predictive blocks includes three candidate predictive blocks.

21. The non-transitory computer-readable storage medium of claim 18, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

22. The non-transitory computer-readable storage medium of claim 18, wherein the index value comprises a variable length code word, wherein a length of the variable length code word is associated with a probability of the candidate predictive block being a highest ranked motion prediction video block for the current video block.

23. A method of encoding video data, the method comprising:
obtaining a motion vector for a current video block;
encoding, in a bitstream, one or more syntax elements that indicate a number of motion vector prediction candidates for the current video block and a subset of motion vector prediction candidates was used to encode the current video block;
generating a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
selecting a predictive video block from the set of generated candidate predictive blocks based on the motion vector; and
generating an index value identifying the selected predictive video block.

24. The method of claim 23, wherein set of generated candidate predictive blocks includes three candidate predictive blocks.

25. The method of claim 23, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

26. The method of claim 23, wherein the index value comprises a variable length code word.

27. The method of claim 26, wherein a length of the variable length code word is associated with a probability of the candidate predictive block being a highest ranked motion prediction video block for the current video block.

28. A device for encoding video data, the device comprising:
a memory configured to store video data; and
a video encoder configured to communicate with the memory and to:
obtain a motion vector for a current video block;
encode, in a bitstream, one or more syntax elements that indicate a number of motion vector prediction candidates for the current video block and a subset of motion vector prediction candidates was used to encode the current video block;
generate a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;
select a predictive video block from the set of generated candidate predictive blocks based on the motion vector; and
generate an index value identifying the selected predictive video block.

29. The device of claim 28, wherein set of generated candidate predictive blocks includes three candidate predictive blocks.

30. The device of claim 28, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

31. The device of claim 28, wherein the index value comprises a variable length code word, wherein a length of the variable length code word is associated with a probability of the candidate predictive block being a highest ranked motion prediction video block for the current video block.

32. A device for encoding video data according to a merge mode, the device comprising:
means for obtaining a motion vector for a current video block;
means for encoding, in a bitstream, one or more syntax elements that indicate a number of motion vector prediction candidates for the current video block and a subset of motion vector prediction candidates was used to encode the current video block;

means for generating a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;

means for selecting a predictive video block from the set of generated candidate predictive blocks based on the motion vector; and means for generating an index value identifying the selected predictive video block.

33. The device of claim 32, wherein set of generated candidate predictive blocks includes three candidate predictive blocks.

34. The device of claim 32, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

35. The device of claim 32, wherein the index value comprises a variable length code word, wherein a length of the variable length code word is associated with a probability of the candidate predictive block being a highest ranked motion prediction video block for the current video block.

36. A non-transitory computer-readable storage medium having stored thereon instructions that, when executed, cause a processor of a device for encoding video data to:

obtain a motion vector for a current video block;

encode, in a bitstream, one or more syntax elements that indicate a number of motion vector prediction candidates for the current video block and a subset of motion vector prediction candidates was used to encode the current video block;

generate a set of candidate predictive blocks based on spatial and temporal neighbors to the current video block, wherein the number of candidate predictive blocks in the set of candidate predictive blocks is equal to the number of motion vector prediction candidates for the current video block as indicated by the one or more syntax elements;

select a predictive video block from the set of generated candidate predictive blocks based on the motion vector; and generate an index value identifying the selected predictive video block.

37. The non-transitory computer-readable storage medium of claim 36, wherein the set of generated candidate predictive blocks includes one or more of an adjacent left video block to the current video block, an adjacent upper video block to the current video block, an adjacent upper-right video block to the current video block, an adjacent lower-left video block to the current video block, and an adjacent temporal video block to the current video block.

38. The non-transitory computer-readable storage medium of claim 36, wherein the index value comprises a variable length code word, wherein a length of the variable length code word is associated with a probability of the candidate predictive block being a highest ranked motion prediction video block for the current video block.

* * * * *